(12) United States Patent
Brenner et al.

(10) Patent No.: US 8,245,236 B2
(45) Date of Patent: Aug. 14, 2012

(54) LOCK BASED MOVING OF THREADS IN A SHARED PROCESSOR PARTITIONING ENVIRONMENT

(75) Inventors: Larry B. Brenner, Austin, TX (US); Dirk Michel, Austin, TX (US); Bret R. Olszewski, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1203 days.

(21) Appl. No.: 12/038,063

(22) Filed: Feb. 27, 2008

(65) Prior Publication Data

US 2009/0217276 A1    Aug. 27, 2009

(51) Int. Cl.
G06F 9/46    (2006.01)
(52) U.S. Cl. ......................................................... 718/104
(58) Field of Classification Search .................... None
See application file for complete search history.

(56) References Cited

U.S. PATENT DOCUMENTS

| | | | |
|---|---|---|---|
| 6,530,079 B1 | 3/2003 | Choi et al. | |
| 6,658,449 B1* | 12/2003 | Brenner et al. | 718/105 |
| 6,883,165 B1 | 4/2005 | Blandy et al. | |
| 6,952,825 B1* | 10/2005 | Cockx et al. | 718/102 |
| 7,035,870 B2 | 4/2006 | McGuire et al. | |
| 7,065,763 B1 | 6/2006 | Martin et al. | |
| 7,290,259 B2* | 10/2007 | Tanaka et al. | 718/1 |
| 2003/0055864 A1* | 3/2003 | Armstrong et al. | 709/107 |
| 2005/0010912 A1* | 1/2005 | Adolphson et al. | 717/151 |
| 2005/0080824 A1 | 4/2005 | Vaidyanathan et al. | |
| 2005/0081199 A1* | 4/2005 | Traut | 718/1 |
| 2006/0123423 A1* | 6/2006 | Brenner | 718/105 |
| 2006/0130062 A1* | 6/2006 | Burdick et al. | 718/100 |
| 2006/0277551 A1* | 12/2006 | Accapadi et al. | 718/107 |
| 2007/0011667 A1 | 1/2007 | Subbiah et al. | |
| 2007/0169127 A1* | 7/2007 | Kashyap | 718/104 |
| 2009/0055830 A1* | 2/2009 | Gusler et al. | 718/104 |
| 2009/0064156 A1* | 3/2009 | He et al. | 718/104 |

OTHER PUBLICATIONS

S. Sridharan, B. Keck, R. Murphy, S. Chandra, and P. Kogge. Thread migration to improve synchronization performance. In Workshop on Operating System Interference in High Performance Applications, 2006; 8 pages.*

* cited by examiner

Primary Examiner — Keith Vicary
(74) Attorney, Agent, or Firm — Robert C. Rolnik; David A. Mims (57) ABSTRACT

The present invention provides a computer implemented method and apparatus to assign software threads to a common virtual processor of a data processing system having multiple virtual processors. A data processing system detects cooperation between a first thread and a second thread with respect to a lock associated with a resource of the data processing system. Responsive to detecting cooperation, the data processing system assigns the first thread to the common virtual processor. The data processing system moves the second thread to the common virtual processor, whereby a sleep time associated with the lock experienced by the first thread and the second thread is reduced below a sleep time experienced prior to the detecting cooperation step.

11 Claims, 8 Drawing Sheets

LOCK BASED MOVING OF THREADS IN A SHARED PROCESSOR PARTITIONING ENVIRONMENT

BACKGROUND OF THE INVENTION

1. Field of the Invention

The present invention relates generally to a computer implemented method, data processing system, and computer program product for placing threads on processors. More specifically, the present invention relates to the placing of threads in a shared processor partitioning environment.

2. Description of the Related Art

Computer designers increasingly rely on multiple processor architectures to take advantage of higher levels of hardware integration and miniaturization available with modern technology. One popular type of architecture is the symmetric multiprocessor (SMP) architecture, for example, as implemented in the Power5™ computer system. Power5 is a trademark of International Business Machines of Armonk, N.Y.

A common feature of symmetric multiprocessors is the ability to assign computer resources from a pool to one or more logical partitions. Computer resources include, for example, memory, disk storage, and physical processors. An architecture that shares physical processors among logical partitions is known as Micro-partitioning™. Micro-partitioning is a trademark of International Business Machines Corporation in the United States, other countries or both. In such an arrangement, a hypervisor may assign a time slice of a physical processor to a logical partition and later assign a second time slice of the physical processor to a second logical partition. Such a time-shared arrangement is known as a virtual processor. A virtual processor is a time-apportioned part of a physical processor. Typically, a virtual processor is apportioned in units measured in timeslices. The timeslices can be grouped in sets called a dispatch wheel.

Before virtualization and the availability of a hypervisor, the operating system time-sliced software threads on physical processors operated in an architecture known as time-sharing. With the availability of a hypervisor, there are two more or less independent schedulers of physical processors. The first scheduler, or hypervisor, dispatches virtual processors to physical processors. The second scheduler, or operating system, manages software threads at execution time.

In a micro-partitioned environment, however, software executes by using processors or virtual processors to execute instructions of a process or of a software thread. A typical operating system instance or partition may have many software threads that operate concurrently on several physical processors. Moreover, partitions may be assigned finer-grained allocations of processor time using micro-partitioning, resulting in apportioning levels of time sharing for the physical processor. This result is a consequence of blending the operating system scheduling and hypervisor partition scheduling. This fine granularity is possible because virtual processors correspond with various entitlements of a physical processor. The entitlement is a proportion of a dispatch wheel that the physical processor operates for the thread. In such an arrangement, each thread runs during the timeslice to which each thread is assigned. Such an arrangement can increase the overall usage of each physical processor.

A software thread may alternate between running and sleeping states within an operating system dispatched to a virtual processor. For example, the software thread runs when all necessary resources are available to that software thread. A resource is available when the resource is not subject to a mutually exclusive lock held by another software thread executing in the same partition. Conversely, a software thread sleeps when another software thread executing in the same partition locks a resource required by the code of that software thread. A sleeping software thread is a software thread that is unable to progress due to a data processing resource being occupied by a lock acquired by a second running software thread. Nevertheless, when the software thread is waiting on some event, for example, a lock release, and the event occurs, the operating system makes the software thread runnable and assigns the software thread a logical processor. A logical processor is an extension to a virtual processor that abstracts hardware threads. It handles execution of the software thread's instructions.

Software can achieve improved performance if multiple software threads operate concurrently. However, care must be taken that a resource that is in use by one thread is reserved or otherwise protected from access and/or revision by a second thread during such limited periods of use by the first thread. One way to exclude a second software thread from access is for the first thread to establish a lock associated with the resource. A lock is a bit set that corresponds to a data processing resource, such as, for example, a tract of memory. The lock may include an index number or other identifier to track details of the lock.

One goal that designers of SMPs attempt to accomplish is minimizing a time that a thread waits on a lock to become available. Thus, software threads that contend on a lock in order to reduce time spent in a sleeping state need to be efficiently scheduled.

SUMMARY OF THE INVENTION

The present invention provides a computer implemented method and apparatus to assign software threads to a common virtual processor of a data processing system having multiple virtual processors and possibly multiple logical processors within the virtual processor. Initially the data processing system may assign a first software thread to the common virtual processor. A data processing system detects cooperation between a first software thread and a second software thread with respect to a lock associated within a resource of the data processing system. Responsive to detecting cooperation, the data processing system moves the second software thread to the common virtual processor.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1A:
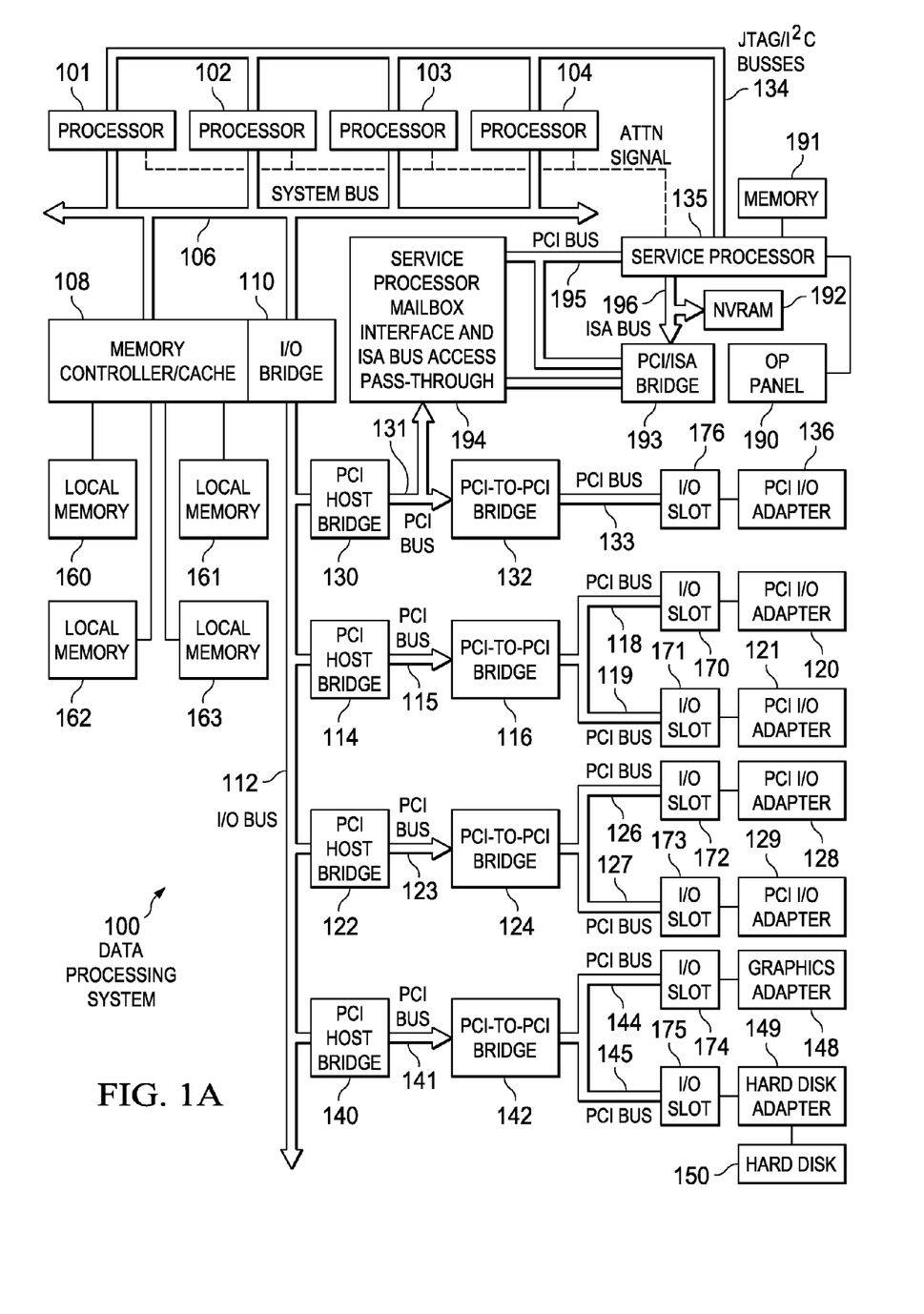
FIG. 1A is a data processing system in accordance with an illustrative embodiment of the invention.

FIG. 1A shows a block diagram of a data processing system in which illustrative embodiments of the invention may be implemented. Data processing system 100 may be a symmetric multiprocessor (SMP) system including a plurality of processors 101, 102, 103, and 104, which connect to system bus 106. For example, data processing system 100 may be an IBM eServer® and implemented as a server within a network. The eServer® is a registered trademarked product of International Business Machines Corporation in Armonk, N.Y. Alternatively, a single processor system may be employed. Also connected to system bus 106 is memory controller/cache 108, which provides an interface to a plurality of local memories 160-163. I/O bus bridge 110 connects to system bus 106 and provides an interface to I/O bus 112. Memory controller/cache 108 and I/O bus bridge 110 may be integrated as depicted.

Data processing system 100 is a logical partitioned (LPAR) data processing system. Thus, data processing system 100 may have multiple heterogeneous operating systems or multiple instances of a single operating system running simultaneously. Each of these multiple operating systems may have any number of software programs executing within it. Data processing system 100 is logically partitioned such that different peripheral component interconnect input/output (PCI I/O) adapters 120, 121, 128, 129, and 136, graphics adapter 148, and hard disk adapter 149 may be assigned to different logical partitions. In this case, graphics adapter 148 connects a display device (not shown), while hard disk adapter 149 connects to and controls hard disk 150.

Thus, for example, suppose data processing system 100 is divided into three logical partitions, P1, P2, and P3. Each of PCI I/O adapters 120, 121, 128, 129, and 136, graphics adapter 148, hard disk adapter 149, each of processors 101-104, and memory from local memories 160-163 is assigned to each of the three partitions. In these examples, local memories 160-163 may take the form of dual in-line memory modules (DIMMs). DIMMs are not normally assigned on a per DIMM basis to partitions. Instead, a partition will get a portion of the overall memory seen by the platform. For example, processors 102-103, some portion of memory from local memories 160-163, and PCI I/O adapters 121 and 136 may be assigned to logical partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. For example, one instance of the Advanced Interactive Executive (AIX®) operating system may be executing within partition P1, a second instance or image of the AIX® operating system may be executing within partition P2, and a Linux® operating system may be operating within logical partition P3. AIX® is a registered trademark of International Business Machines Corporation. Linux® is a registered trademark of Linus Torvalds.

Peripheral component interconnect (PCI) host bridge 114 connected to I/O bus 112 provides an interface to PCI local bus 115. A number of PCI input/output adapters 120-121 connect to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters, that is, expansion slots for add-in connectors. Each PCI I/O adapter 120-121 provides an interface between data processing system 100 and input/output devices such as, for example, other network computers, which are clients to data processing system 100.

An additional PCI host bridge 122 provides an interface for an additional PCI bus 123. PCI bus 123 connects to a plurality of PCI I/O adapters 128-129. PCI I/O adapters 128-129 connect to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. Consequently, data processing system 100 allows connections to multiple network computers.

A memory mapped graphics adapter 148 is inserted into I/O slot 174 and connects to I/O bus 112 through PCI bus 144, PCI-to-PCI bridge 142, PCI bus 141, and PCI host bridge 140. Hard disk adapter 149 may be placed into I/O slot 175, which connects to PCI bus 145. In turn, this bus connects to PCI-to-PCI bridge 142, which connects to PCI host bridge 140 by PCI bus 141.

A PCI host bridge 130 provides an interface for PCI bus 131 to connect to I/O bus 112. PCI I/O adapter 136 connects to I/O slot 176, which connects to PCI-to-PCI bridge 132 by PCI bus 133. PCI-to-PCI bridge 132 connects to PCI bus 131. This PCI bus also connects PCI host bridge 130 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. NVRAM storage 192, also known as non-volatile RAM, connects to ISA bus 196. Service processor 135 connects to service processor mailbox interface and ISA bus access pass-through logic 194 through its local PCI bus 195. Service processor 135 also connects to processors 101-104 via a plurality of JTAG/I$^2$C busses 134. JTAG/I$^2$C busses 134 are a combination of JTAG/scan busses, as defined by Institute for Electrical and Electronics Engineers standard 1149.1, and Philips I$^2$C busses. However, alternatively, JTAG/I$^2$C busses 134 may be replaced by only Philips I$^2$C busses or only JTAG/scan busses. All SP-ATTN signals of the processors 101, 102, 103, and 104 connect together to an interrupt input signal of service processor 135. Service processor 135 has its own local memory 191 and has access to the hardware OP-panel 190.

When data processing system 100 is initially powered up, service processor 135 uses the JTAG/I²C busses 134 to interrogate the system processors 101-104, memory controller/cache 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating processors 101-104, memory controller/cache 108, and I/O bridge 110. Any error information for failures detected during the BISTs, BATs, and memory tests are gathered and reported by service processor 135.

If a meaningful or valid configuration of system resources is still possible after taking out the elements found to be faulty during the BISTs, BATs, and memory tests, then data processing system 100 is allowed to proceed to load executable code into local memories 160-163. Service processor 135 then releases processors 101-104 for execution of the code loaded into local memory 160-163. While processors 101-104 are executing code from respective operating systems within data processing system 100, service processor 135 enters a mode of monitoring and reporting errors. The type of items monitored by service processor 135 includes, for example, the cooling fan speed and operation, thermal sensors, power supply regulators, and recoverable and non-recoverable errors reported by processors 101-104, local memories 160-163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and determine that this condition is predictive of a hard failure. Based on this determination, service processor 135 may mark that processor or other resource for deconfiguration during the current running session and future Initial Program Loads (IPLs). IPLs are also sometimes referred to as a "boot" or "bootstrap."

Data processing system 100 may be implemented using various commercially available computer systems. For example, data processing system 100 may be implemented using IBM eServer® iSeries® Model 840 system available from International Business Machines Corporation. Such a system may support logical partitioning, wherein an OS/400 operating system may exist within a partition. iSeries® and OS/400 are registered trademarks of International Business Machines Corporation.

Those of ordinary skill in the art will appreciate that the hardware depicted in FIG. 1A may vary. For example, other peripheral devices, such as optical disk drives and the like, also may be used in addition to or in place of the hardware depicted. The depicted example does not imply architectural limitations with respect to embodiments of the present invention.

Figure 1B:
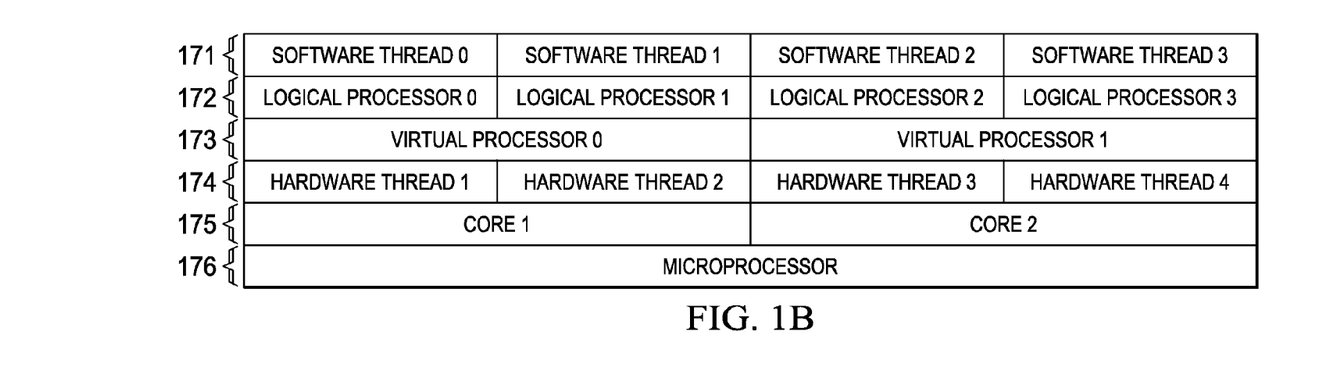
FIGS. 1B and 1C are logical diagrams of components of a data processing system in accordance with an illustrative embodiment of the invention.

FIG. 1B shows a logical configuration of assignments at a moment in time of a simultaneous multiprocessing system in accordance with an embodiment of the invention. Each tier of architecture supports the tier immediately above. Microprocessor 176 may provide support circuits for one or more cores in core tier 175. Core tier 175 may be comprised of multiple processors, for example, processors 101-104 of FIG. 1A. Core tier 175 supports plural hardware threads, that is, each core provides support to multiple hardware threads. Hardware thread tier 174 supports virtual processor tier 173. Virtual processor tier 173 supports logical processor tier 172. Logical processor tier 172 supports software thread tier 171.

Figure 1C:
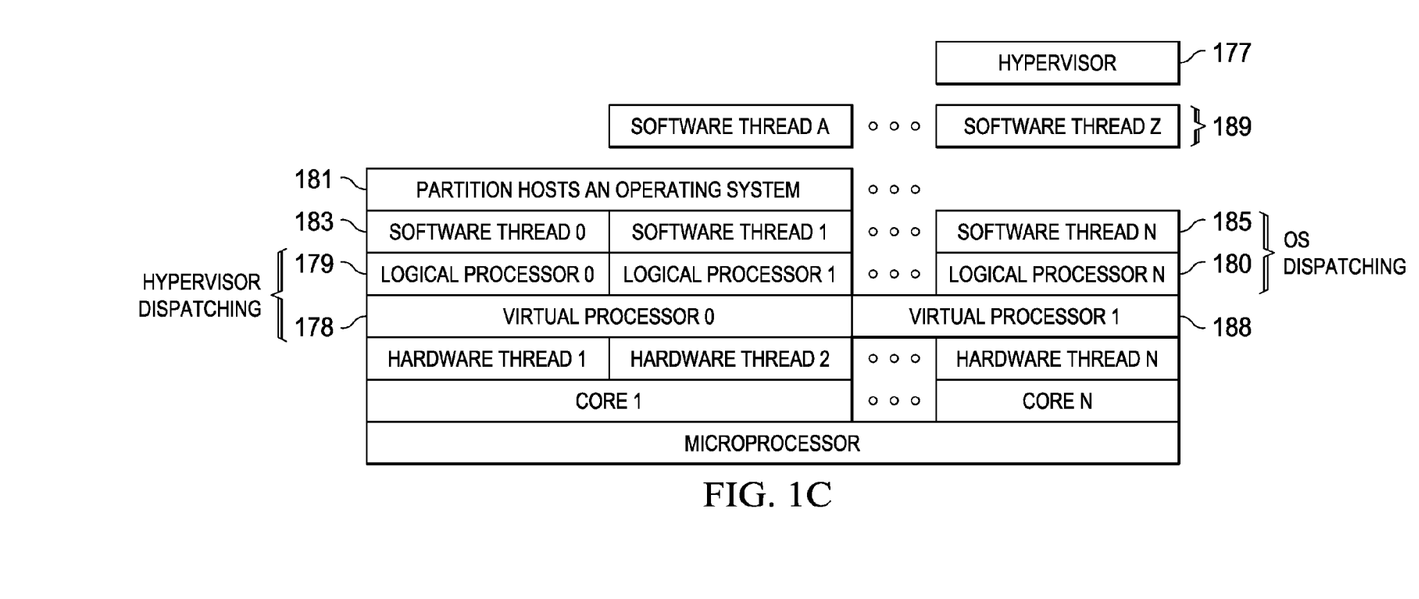

FIG. 1C shows an example of a logical configuration as illustrated in FIG. 1B in accordance with an embodiment of the invention. Hypervisor 177 dispatches virtual processor 0 178 to core 1 resulting in logical processor 0 179 and logical processor N 180 becoming active. Operating system 181 dispatches each software thread to a logical processor. For example, operating system 181 dispatches software thread 0 183 to logical processor 0 179, and software thread N 185 to logical processor N 180. From time to time, a software thread reaches a point where it is blocked or preempted. A queue of blocked and ready to run software threads may be stored in ready-to-run queue 189. Operating system 181 may select from among the software threads in the ready-to-run queue 189 to dispatch to a logical processor. Initially, there may be no bias in assigning software threads to logical processors, nor even to virtual processors. Illustrative embodiments of the invention may apply a bias so that software threads that cooperate on a lock are dispatched to logical processors that themselves are dispatched on to a common virtual processor. In contrast, data processing systems of the prior art dispatch software threads without regard to which among several virtual processors supports each of the cooperating software threads.

Additional virtual processors, for example, virtual processor 1 188 may operate on additional cores (not shown) or even Core 1, though at a different time than virtual processor 0 178. Logical processors (not shown) may be dispatched to the additional virtual processors. Software threads (not shown) may be dynamically dispatched to these logical processors as well. Operating system 181 may use software threads among these other logical processors. A software thread that cooperates on a lock with software thread 0 183 may initially be dispatched to the logical processors that are themselves dispatched to virtual processor 1 188. The operating system can detect cooperation on a lock between software threads, for example, when the operating system detects that each software thread attempts to acquire the lock. A computer implemented method described in FIGS. 4B through 6 may reassign such software threads to be dispatched together with software thread 0 183.

Figure 2A:
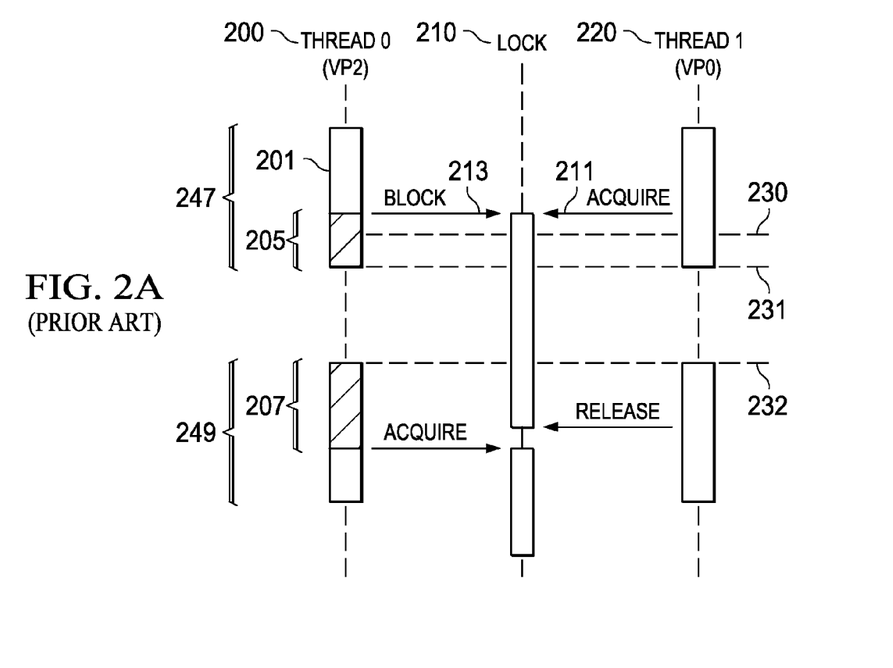
FIGS. 2A and 2C are timing diagrams of two software threads.

FIG. 2A shows software threads dispatched on virtual processors in accordance with an illustrative embodiment of the invention. The software threads may be assigned to distinct processors on a routinely scheduled timeslice. A software thread is a unit of execution within a process. Each processor has one or more software threads. Thus, software thread 0 200 may be assigned to logical processor 0 on virtual processor 2. Software thread 1 220 may be assigned to logical processor 2 on virtual processor 0. Initially, software thread 0 200 and software thread 1 220 are dispatched on their respective virtual processors. Software thread 0 200 is dispatched during two timeslices that include entitlement period 247 and entitlement period 249, which includes blocked period 207. At first point in time 211, software thread 1 220 acquires lock 210. Since a virtual processor may be preempted at any time by the hypervisor, FIG. 2A illustrates software thread 1's virtual processor as preempted at time 231. As a result, software thread 0 200 is unable to make forward progress until software thread 1's virtual processor is redispatched at time 232 and software thread 1 220 releases the lock. At a second point in time 213, software thread 0 200 attempts to acquire lock 210 and is blocked. Software thread 0 200 goes to sleep during sleep period 205, following active period 201. Software thread 0 200 may cede remaining time to another software thread, however software thread 0 200 will be unable to make further progress until software thread 1 220, via virtual processor 0, releases software thread 2 200 or perhaps later if other threads with a higher priority are also contending on the thread. In some cases, software thread 0 200 may not be able to cede, such as the case for a device driver lock that operates with interrupts disabled. In that case, the logical processor can be blocked 207 from completing any useful work until the lock is release by software thread 1 220.

Figure 2B:
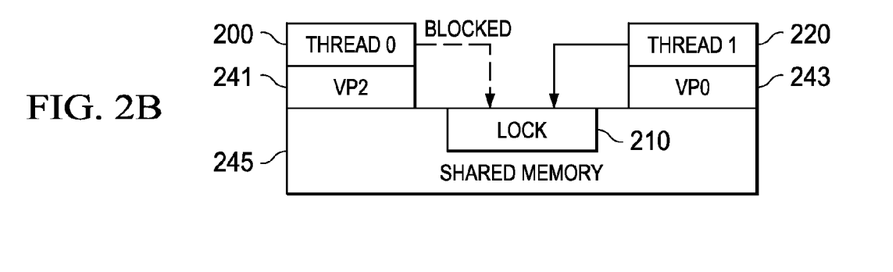
FIG. 2B shows the assignment of software threads to one or more virtual processors during an interval of time.

FIG. 2B shows the assignment of the software threads to their respective virtual processors during an interval of time. The assignment is shown at a time that corresponds with time 230 of FIG. 2A. Software thread 0 200 is dispatched to virtual processor 2 241. Software thread 1 220 is dispatched to virtual processor 0 243. Lock 210, in shared memory 245, is a lock that software thread 1 220 has acquired, but that software thread 0 200 is blocked on. The assignment of software thread 0 200 to one virtual processor and the assignment of software thread 1 220 to a second virtual processor contributes to concurrent operation of software thread 0 200 and software thread 1 220. As a result, the sleep periods of FIG. 2A may leave the assigned virtual processor without a software thread to execute instructions in association therewith.

Figure 2C:
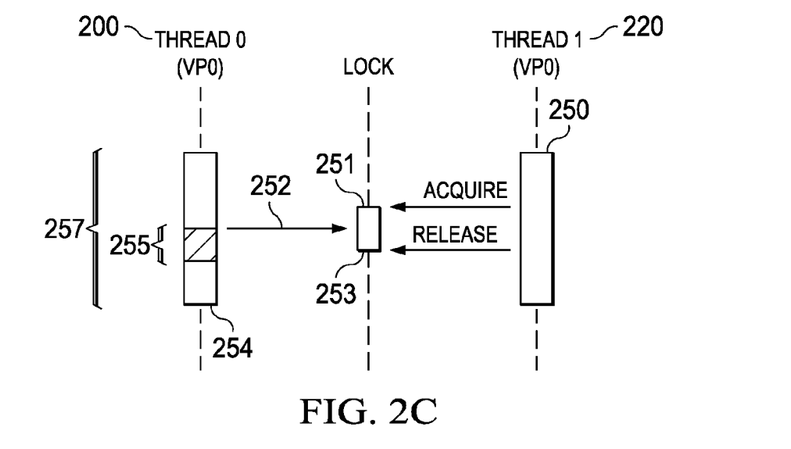

In contrast, FIG. 2C illustrates an assignment of software threads to processors in accordance with an illustrative embodiment of the invention. The assignment of software thread 0 200 and software thread 1 220 to a common virtual processor contributes to the software threads each being assigned to logical processors having a common virtual processor for support. Consequently, software thread 0 200 has sleep period 255 that better utilizes the common virtual processor during the timeslices software thread 0 200 is dispatched.

FIG. 2C depicts a sequence of events. At thread run time 250, software thread 1 220 runs on a logical processor assigned to virtual processor 0. At lock acquisition time 251, software thread 1 220 acquires the lock. At block time 252, software thread 0 200 attempts to obtain the lock and is blocked. Subsequently, software thread 1 220 releases the lock at release time 253. Next, software thread 0 200 acquires the lock, thereby ending sleep period 255 in entitlement period 257. At the end of timeslice 254, software thread 0 200 may be placed in a wait queue.

Figure 2D:
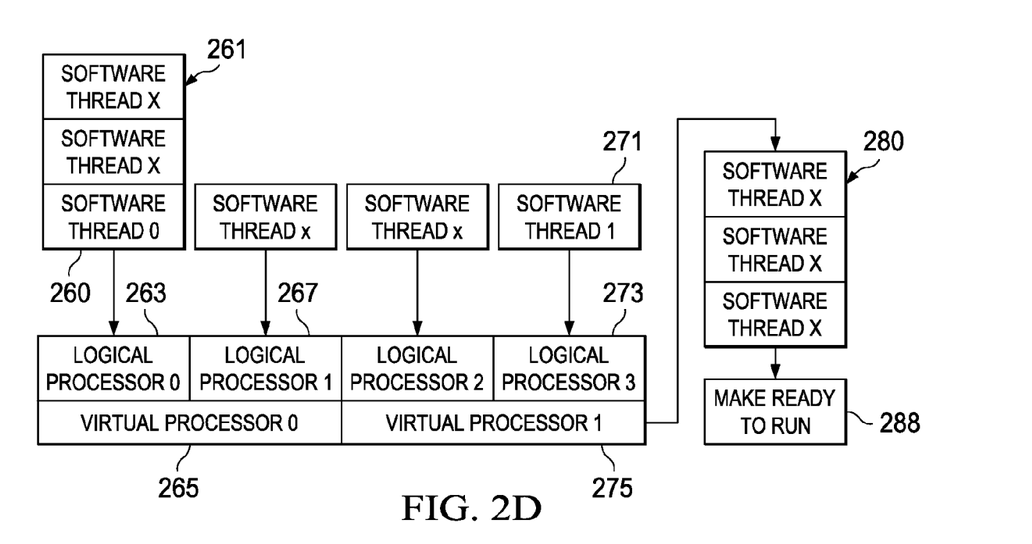
FIGS. 2D, 2E and 2F show steps for moving a software thread to operate on a logical processor in accordance with an illustrative embodiment of the invention.
Figure 2E:
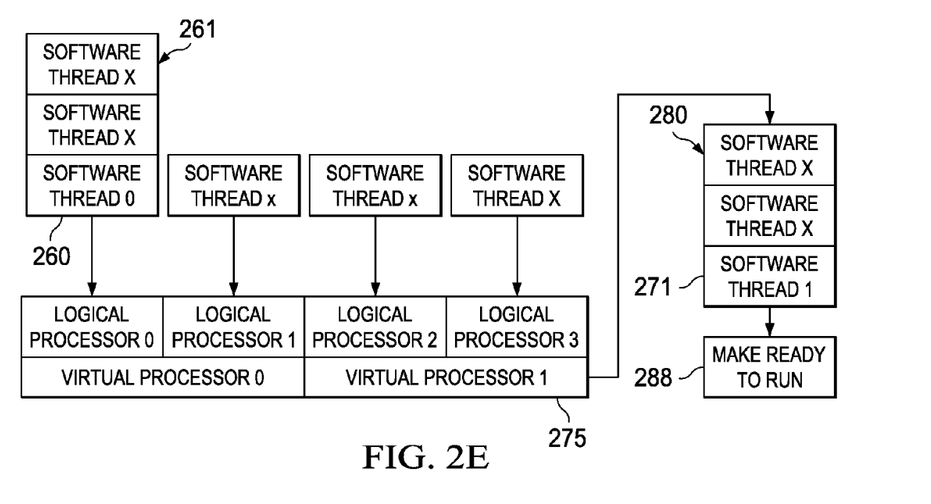
Figure 2F:
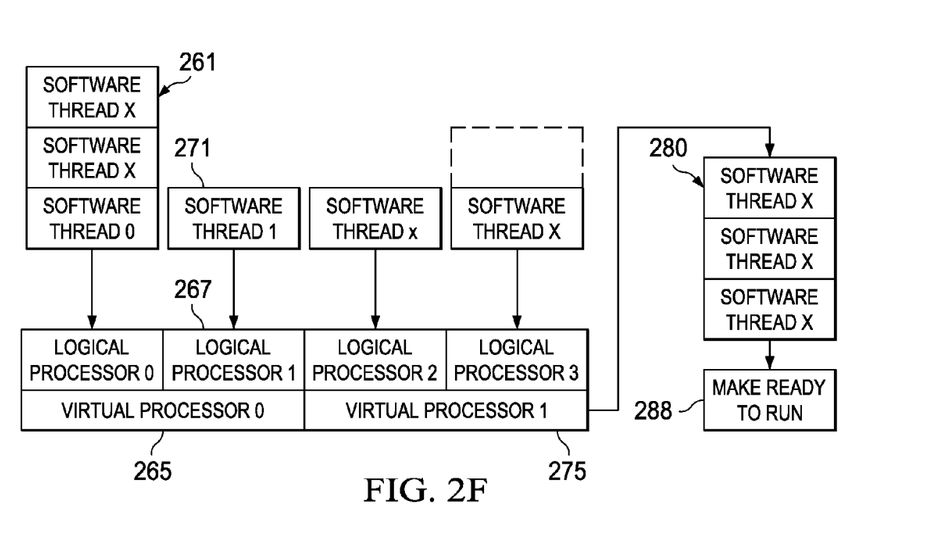

Accordingly, FIGS. 2D-F illustrate the assignment of software thread 1 220 to virtual processors during times of FIG. 2C in accordance with an illustrative embodiment of the invention. Thus, for software threads that may contend for a single lock, some efficiency may be obtained by moving a software thread to a common virtual processor with the second software thread. Two software threads that cooperate on a lock may be moved to the common virtual processor in accordance with an illustrative embodiment of the invention, as shown in FIG. 2C.

FIG. 2D shows software threads assigned to logical processors in accordance with an illustrative embodiment of the invention. Software thread 0 260 is in a sleeping state known as ready-to-run within ready to run queue 261. When the software thread 0 260 is dispatched, it runs on logical processor 0 263. The virtual processor 0 265 supports both logical processor 0 263 as well as logical processor 1 267. Software thread 1 271, in contrast, runs on logical processor 3 273 and is supported by virtual processor 1 275.

Based on FIG. 2D, FIG. 2E shows that at a subsequent time, software thread 1 271 enters wait queue 280. A software thread can enter the wait queue when it is preempted, or after becoming blocked. While on the wait queue, the software thread is in a state where it is not eligible to be dispatched on a virtual processor. The status of a virtual processor that is undispatched is distinct from that of a software thread which is undispatched and is explained further below with reference to FIG. 4.

FIG. 2F shows operation of make ready to run software component 288 at a time subsequent to FIG. 2D. Make ready to run software component 288 may be instructions executed by the operating system. For example, the instructions may be for a routine called "thread_wakeup_lock." The routine selects a logical processor to which the software thread at the head of the wait queue is assigned. FIG. 2F shows the assignment of software thread 1 271 to logical processor 1 267. Make ready to run 288 may refer to an optimization flag to detect if the associated software thread is to be assigned logical processors without reference to any previous processor to which the software thread had been previously assigned. Accordingly, the optimization flag may suppress assigning a software thread based on any kind of processor affinity the software thread may have.

Figure 3:
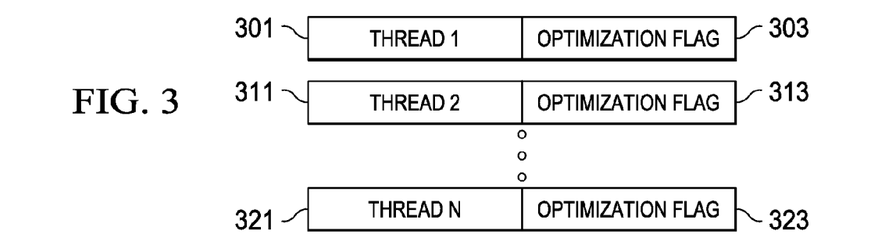
FIG. 3 shows a data structure associated with each software thread in accordance with an illustrative embodiment of the invention.

FIG. 3 shows a data structure associated with each software thread in accordance with an illustrative embodiment of the invention. Each software thread is associated with an optimization flag. An optimization flag is one or more bits set to indicate that a software thread may be tested for cooperation on a lock. The software thread may then be assigned to a common virtual processor with a second software thread by an operating system implemented in accordance with an illustrative embodiment of the invention. For example, software thread 1 301 uses optimization flag 303 to signal to the operating system the status of software thread 1 301 concerning the testing for cooperation and attendant common assignment to virtual processors. Additional thread and optimization flags are shown, for example, software thread 2 311 and optimization flag 313, as well as software thread n 321 and optimization flag 323.

Figure 4A:
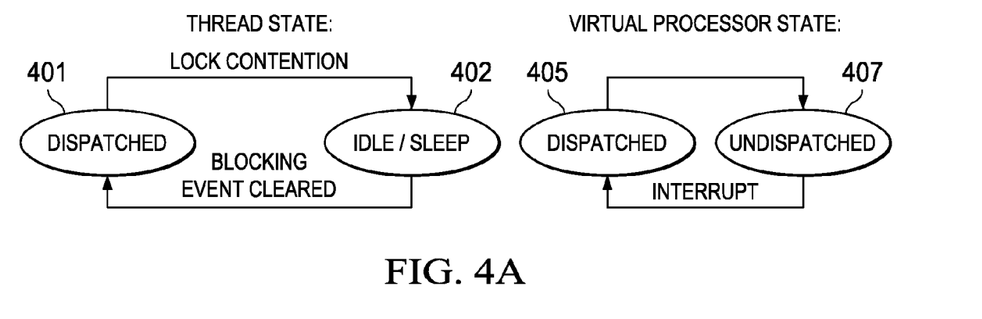
FIG. 4A shows states of a software thread and a virtual processor in accordance with an illustrative embodiment of the invention.

FIG. 4A shows states of a software thread and a virtual processor in accordance with an illustrative embodiment of the invention. A thread state may alternate between dispatched 401 and idle/sleep 402. The software thread may transition to the idle/sleep state when a blocking event, such as lock contention or synchronous I/O, is detected by the software thread. A sleep period is a time that a software thread is in a sleep or idle state. Similarly, the software thread may transition to dispatched 401 when the blocking event is cleared for the software thread.

A virtual processor may move between the states of dispatched 405 and undispatched 407. An interrupt may occur during which an interrupt handler of the operating system assigns a software thread to the virtual processor. When a software thread accesses a locked resource, the software thread will block. This blocking may result in the virtual processor being undispatched 407 by the operating system ceding to the hypervisor. Thus, when a software thread is idle, for example, idle 402, the virtual processor to which the software thread is assigned or to which the software thread is 'on' may become undispatched 407.

Figure 4B:
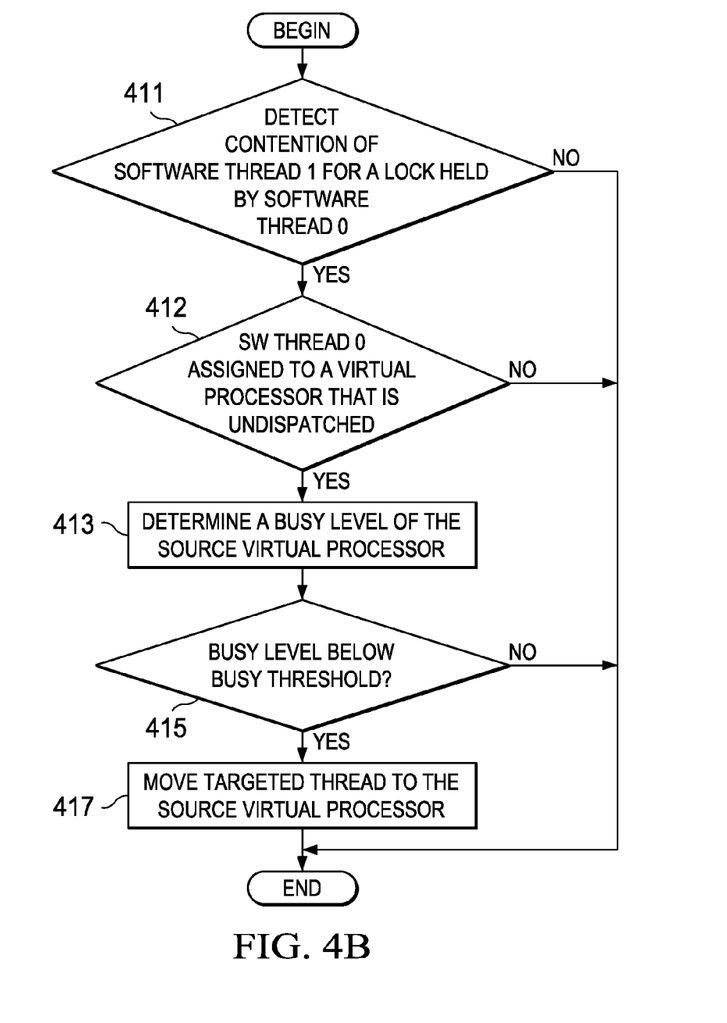
FIG. 4B shows a flowchart that allows an operating system to move a software thread to a virtual processor in accordance with an illustrative embodiment of the invention.

FIG. 4B shows a flowchart that allows an operating system to move a software thread to a virtual processor in accordance with an illustrative embodiment of the invention. The operating system may cooperate with a hypervisor to perform the steps of FIG. 4B. Initially, the operating system executes lock code on behalf of a software thread. The lock operation detects that the lock is currently unavailable, due to it being held by another software thread (step 411). Furthermore, the software thread, for example, software thread 0 260 of FIG. 2D, may be identified to be on a logical processor supported by a virtual processor that is currently undispatched (step 412). The operating system blocks the software thread (software thread 1) attempting to acquire the lock. However, it may determine the desirability of targeting the blocking thread (software thread 1) to a logical processor on the same virtual processor as the lock holding thread (software thread 0) (step 413). This retargeting may be done by determining the relative busyness of that virtual processor (virtual processor 0) in terms of CPU capacity. If that virtual processor has available capacity, the blocking software thread (software thread 1) will be targeted for wakeup on a logical processor (logical processor 1) on that virtual processor. The operating system determines if the busy level is below a busy threshold (step 415). Negative determinations at steps 411, 412, and 415 may cause the operating system to terminate processing.

A determination that a source virtual processor has a busy level below the busy threshold results in the operating system moving a targeted software thread to the source virtual processor (step 417). A software thread is targeted for wake up when a process or system call indicates that the software thread is to be dispatched to a logical processor. Processing terminates thereafter. A negative determination concerning step 415 also causes processing to terminate.

Moving the targeted software thread may entail the operating system moving a software thread. As an example, FIGS. 2E and 2F show software thread 1 in a state after the software thread had run on virtual processor 1 271. FIG. 2F shows the software thread following a move to virtual processor 0 265.

Figure 5:
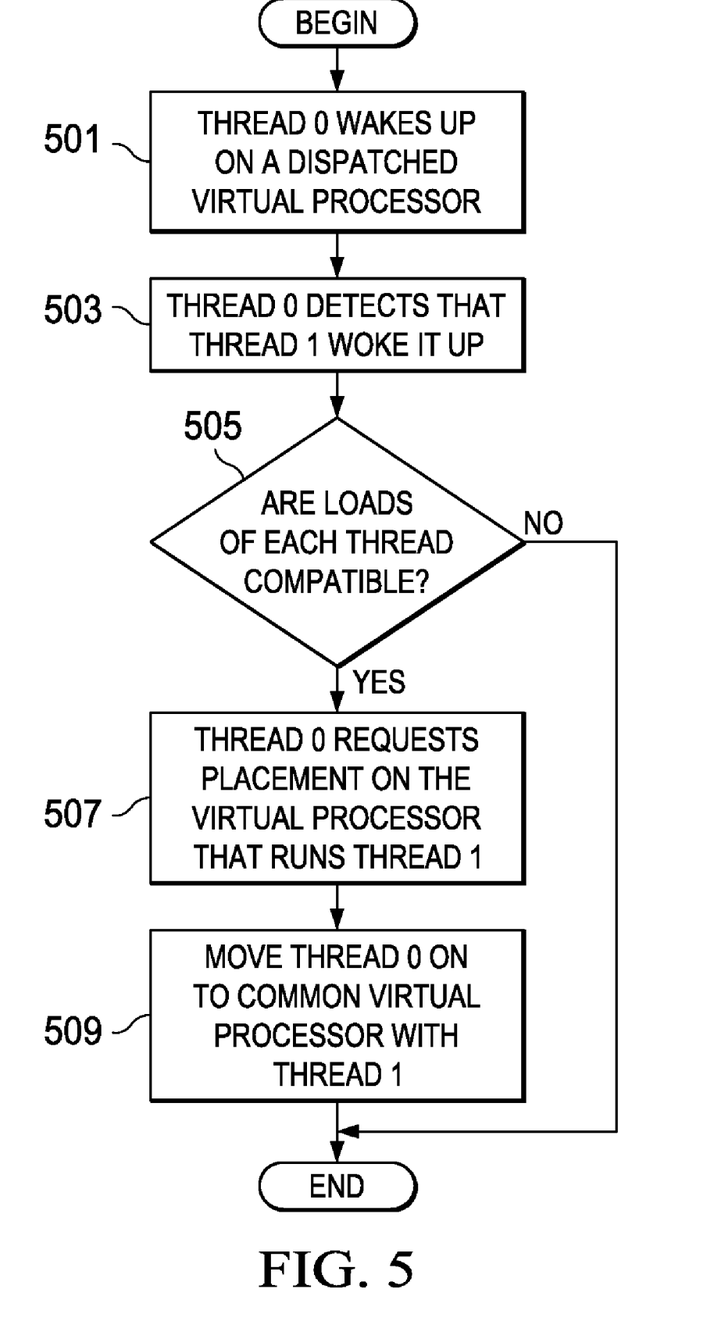
FIG. 5 shows a flowchart that responds to a software thread following wake up in accordance with an illustrative embodiment of the invention.

FIG. 5 shows a flowchart that responds to a software thread following wake up in accordance with an illustrative embodiment of the invention. Initially, a software thread 0 wakes up on a dispatched virtual processor (step 501). Next, software thread 0 detects that software thread 1 woke it up (step 503). The software thread may cooperate with the operating system and/or the hypervisor. Next, software thread 0 determines if the loads of each thread are compatible based on virtual processor capacity (step 505). The supporting virtual processors are the virtual processors that are assigned to software thread 0 and software thread 1. The supporting virtual processors can be compatible if, for example, the targeted virtual processor is consumed at a rate that is less than a compatible limit consumed. The compatible limit can be, for example 80%. The targeted virtual processor is the virtual processor that is assigned to software thread that awakens another thread. In this case, the software thread that awakens another thread is software thread 1. Consumption is the relative number of occupied clock cycles as compared to the net clock cycles available. In addition, software thread 0 and software thread 1 can be further optimized if each software thread has the same home processor and both software threads run concurrently on that home processor. A home processor is a virtual processor that a software thread used more than any other virtual processor during an interval.

Compatibility is tempered by the operating system mechanisms to avoid overloading a virtual processor. Thus, placing software threads on a common home processor is performed to the extent that a virtual processor does not become disproportionately undispatched among all virtual processors. That is, the CPU consumption is a factor in placing the two or more software threads to a common processor. A negative result to step 505 occurs when software thread 0 and software thread 1 are determined to not be compatible. In which case, processing terminates.

However, if software thread 0 and software thread 1 are compatible, software thread 0 requests placement on the virtual processor that runs software thread 1 (step 507). The request may be made to the operating system and subsequently the hypervisor. Next, the operating system moves software thread 0 on to the common virtual processor with software thread 1 (step 509). Processing terminates thereafter.

Figure 6:
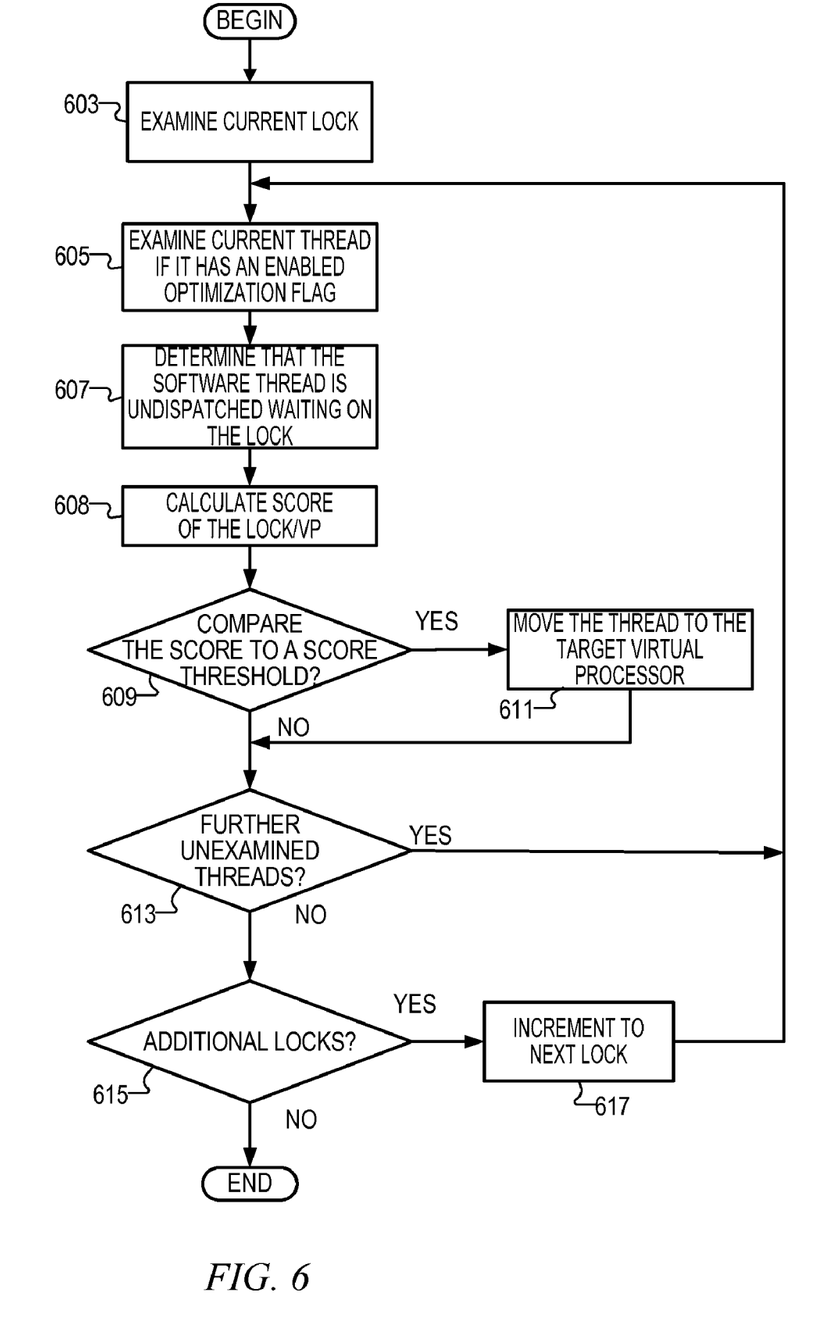
FIG. 6 shows a flowchart that may move software threads based on an asynchronous manner in accordance with an illustrative embodiment of the invention.

FIG. 6 shows a flowchart that may move software threads based in an asynchronous manner in accordance with an illustrative embodiment of the invention. Initially, the operating system examines a current lock (step 603). Next, the operating system examines a current software thread provided the software thread has an enabled optimization flag (step 605). Next, the operating system determines that the software thread is undispatched waiting on the lock (step 607).

Next, the operating system calculates a score associated with the lock and potential CPU capacity of the virtual processor (step 608). The operating system may compare the score to a score threshold (step 609). The score is a measure of suitability for the software thread to be placed on a virtual processor. The score can be a measure of instantaneous capacity of the virtual processor for processing software threads. A score threshold is a comparison value. The operating system uses the score threshold to determine whether the score is sufficient to move the software thread to a virtual processor. The score could be a limit on the capacity of the virtual processor. For example, if the virtual processor were already 80% consumed, it might be counterproductive to move more software threads onto it. If the score is above the score threshold, the operating system moves the software thread to the target virtual processor (step 611). Next, the hypervisor determines if there are further unexamined software threads (step 613). If further software threads are unexamined, the hypervisor continues at step 605. Otherwise, the hypervisor determines if additional locks are unexamined (step 615). If so, the hypervisor increments to the next lock (step 617). The hypervisor returns to step 605 and the processing continues. If the result of step 615 is negative, processing terminates.

The illustrative embodiments permit software threads that cooperate on a lock to be placed on a common virtual processor. An operating system may detect cooperating software threads, for example, by performing steps 411 and 412 of FIG. 4, step 503 of FIG. 5, or steps 608 and 609 of FIG. 6. Such an arrangement can improve processor utilization without overburdening the data processing system with context switches or inefficient assignment of CPU time to spin locks. It is appreciated that although examples of moving a software thread to a common virtual processor with another software thread, that in practice, embodiments of the invention may move sets of three or more software threads together on a virtual processor as well.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for assigning software threads to a first virtual processor of a data processing system having a plurality of virtual processors, the method comprising:
    determining that a load on a first software thread and a load on a second software thread are above a busy threshold;
    assigning the first software thread to the first virtual processor based on a determination that the load on the first software thread and the load on the second software thread are above the busy threshold;
    detecting cooperation between the first software thread and the second software thread with respect to a lock associated with a resource of the data processing system, wherein the step of detecting cooperation comprises both detecting that the first software thread is targeted for wakeup on a second virtual processor that is undispatched and detecting that the second software thread targeted the first software thread for wakeup; and
    responsive to the step of detecting cooperation, moving the second software thread to the first virtual processor.

2. The computer implemented method of claim 1, wherein the step of detecting cooperation comprises:
    determining whether a targeted virtual processor has a consumption below a compatible limit, wherein the targeted virtual processor is a virtual processor assigned to the second software thread.

3. The computer implemented method of claim 1 further comprising:
    determining that a score is larger than a score threshold, wherein the step of moving the second software thread to the first virtual processor is responsive to a determination that the score is larger than the score threshold.

4. The computer implemented method of claim 1, further comprising:
    determining that a first optimization flag is set for the first software thread and that a second optimization flag is set for the second software thread; and
    performing both the detecting step, and the moving step based on a determination that the first optimization flag is set and the second optimization flag is set.

5. A computer program product for assigning software threads to a first virtual processor of a data processing system having a plurality of virtual processors, the computer program product comprising: a computer usable program code stored to a non-transitory computer readable medium, the computer usable program code comprising:
    computer usable program code for determining that a load on a first software thread and a load on a second software thread are above a busy threshold;
    computer usable program code for assigning the first software thread to the first virtual processor based on a determination that the load on the first software thread and the load on the second software thread are above the busy threshold;
    computer usable program code for detecting cooperation between the first software thread and the second software thread with respect to a lock associated with a resource of the data processing system, wherein the computer usable program code for detecting cooperation comprises both computer usable program code for detecting that the first software thread is targeted for wakeup on a second virtual processor that is undispatched and computer usable program code for detecting that the second software thread targeted the first software thread for wakeup; and
    computer usable program code for moving the second software thread to the first virtual processor in response to the computer usable program code for detecting cooperation.

6. The computer program product of claim 5, wherein the computer usable program code for detecting cooperation comprises:
    computer usable program code for determining whether a targeted virtual processor has a consumption below a compatible limit, wherein a targeted virtual processor is the virtual processor assigned to the second software thread.

7. The computer program product of claim 5 further comprising:
    computer usable program code for determining that a score is larger than a score threshold, wherein the computer usable program code for moving the second software thread to the first virtual processor is responsive to a determination that the score is larger than the score threshold.

8. The computer program product of claim 5, further comprising:
    computer usable program code for determining that a first optimization flag is set for the first software thread and that a second optimization flag is set for the second software thread; and
    the computer usable program code for detecting executes based on a determination that the first optimization flag is set and the second optimization flag is set, and
    the computer usable program code for assigning executes based on a determination that the first optimization flag is set and the second optimization flag is set.

9. A data processing system comprising:
a bus;
a storage device connected to the bus, wherein computer usable code is located in the storage device;
a communication unit connected to the bus;
a hardware processor connected to the bus, wherein the hardware processor executes the computer usable code for assigning software threads to a first virtual processor of a data processing system having a plurality of virtual processors, the hardware processor further executes the computer usable code to determine that a load on a first software thread and a load on a second software thread are above a busy threshold; assign the first software thread to the first virtual processor based on a determination that the load on the first software thread and the load on the second software thread are above the busy threshold; detect cooperation between the first software thread and the second software thread with respect to a lock associated with a resource of the data processing system wherein in executing computer usable code to perform the detecting, the hardware processor executes computer usable code to both detect that the first software thread is targeted for wakeup on a second virtual processor that is undispatched and detect that the second software thread targeted the first software thread for wakeup; and move the second software thread to the first virtual processor in response to the hardware processor executing the computer usable code to detect cooperation.

10. The data processing system of claim 9, wherein in executing computer usable code to detect cooperation, the hardware processor executes computer usable code to determine whether a targeted virtual processor has a consumption below a compatible limit a virtual processor assigned to the second software thread.

11. The data processing system of claim 9, wherein the hardware processor further executes computer usable code to determine that a score is larger than a score threshold, wherein executing computer usable code to move the second software thread to the first virtual processor is responsive to a determination that the score is larger than the score threshold.

* * * * *